United States Patent
Matsusue

(10) Patent No.: US 11,584,803 B2
(45) Date of Patent: Feb. 21, 2023

(54) FINE CELLULOSE FIBER AND METHOD FOR PRODUCING SAME

(71) Applicant: Daio Paper Corporation, Ehime (JP)

(72) Inventor: Ikko Matsusue, Ehime (JP)

(73) Assignee: Daio Paper Corporation, Ehime (JP)

(*) Notice: Subject to any disclaimer, the term of this patent is extended or adjusted under 35 U.S.C. 154(b) by 15 days.

(21) Appl. No.: 17/049,825

(22) PCT Filed: May 17, 2019

(86) PCT No.: PCT/JP2019/019606
§ 371 (c)(1),
(2) Date: Oct. 22, 2020

(87) PCT Pub. No.: WO2019/221256
PCT Pub. Date: Nov. 21, 2019

(65) Prior Publication Data
US 2021/0380724 A1    Dec. 9, 2021

(30) Foreign Application Priority Data
May 18, 2018  (JP) .............................. JP2018-096106

(51) Int. Cl.
*C08B 5/00* (2006.01)
*D01F 2/24* (2006.01)
*C08L 1/16* (2006.01)

(52) U.S. Cl.
CPC .................. *C08B 5/00* (2013.01); *C08L 1/16* (2013.01); *D01F 2/24* (2013.01); *D10B 2201/01* (2013.01)

(58) Field of Classification Search
CPC .................. C08B 5/00; C08L 1/16; D01F 2/24
See application file for complete search history.

(56) References Cited

U.S. PATENT DOCUMENTS

| 11,021,577 B2 * | 6/2021 | Belosinschi | ............ C08H 8/00 |
| 2011/0196139 A1 | 8/2011 | Lee et al. | |
| 2016/0115249 A1 | 4/2016 | Noguchi et al. | |
| 2017/0226398 A1 | 8/2017 | Shimaoka et al. | |
| 2019/0382948 A1 | 12/2019 | Matsusue | |
| 2020/0063292 A1 | 2/2020 | Matsusue | |

FOREIGN PATENT DOCUMENTS

| EP | 3660055 | 6/2020 | |
| JP | 46-10551 | 11/2006 | |
| JP | 2009-293167 | 12/2009 | |
| JP | 2010-216021 | 9/2010 | |
| JP | 2013-127141 | 6/2013 | |
| JP | 2017-066272 | 4/2017 | |
| JP | 2018-141249 | 9/2018 | |
| JP | 2018-193440 | 12/2018 | |
| JP | 2018-193465 | 12/2018 | |
| JP | 6404415 | 2/2019 | |
| JP | 6540925 | 7/2019 | |
| WO | 2014/185505 | 11/2014 | |
| WO | 2016-002689 | 4/2017 | |
| WO | 2017/170908 | 10/2017 | |
| WO | WO-2020045533 A1 * | 3/2020 | ............. C08B 15/04 |
| WO | WO-2020138158 A1 * | 7/2020 | ............. D21C 9/002 |

OTHER PUBLICATIONS

Luneva et al., "Cellulose Phosphorylation with a Mixture of Orthophosphoric Acid and Ammonium Polyphosphate in Urea Medium" Russian Journal of Applied Chemistry vol. 87 No. 10 pp. 1558-1565 (Year: 2014).*
English machine translation of WO2020045533, downloaded from worldwide.espacenet.com (Year: 2020).*
English machine translation of WO2020138158, downloaded from worldwide.espacenet.com (Year: 2020).*
International Search Report for PCT/JP2019/019606, dated Aug. 20, 2019.

* cited by examiner

*Primary Examiner* — Eric Olson
(74) *Attorney, Agent, or Firm* — Andrus Intellectual Property Law

(57) ABSTRACT

A fine cellulose fiber in which when the fine cellulose fiber is formed into a dispersion, the dispersion has very high light transmittance and viscosity, and a method for producing the fine cellulose fiber. The fine cellulose fiber has a fiber width of 1 to 200 nm. A part of hydroxy groups of the cellulose fiber are substituted with a predetermine functional group to introduce an ester of phosphorus-oxo acid, and the introduction amount of the functional group is more than 2.0 mmol per 1 g of the cellulose fiber. For producing the fine cellulose fiber, to cellulose fiber is added a solution having a pH of less than 3.0 and including an additive (A) containing at least one of a phosphorus-oxo acid and a phosphorus-oxo acid metal salt and an additive (B) containing at least one of urea and a urea derivative, and the mixture is heated to perform fibrillation.

10 Claims, No Drawings

FINE CELLULOSE FIBER AND METHOD FOR PRODUCING SAME

CROSS-REFERENCE TO RELATED APPLICATIONS

This application is the U.S. national stage application of International Application PCT/JP2019/019606, filed May 17, 2019, which international application was published on Nov. 21, 2019, as International Publication WO 2019/221256 in the Japanese language. The International Application claims priority of Japanese Patent Application No. 2018-096106, filed May 18, 2018. The international application and Japanese application are both incorporated herein by reference, in entirety.

TECHNICAL FIELD

The present invention relates to fine cellulose fiber, and a method for producing the fine cellulose fiber.

BACKGROUND ART

In recent years, attention has been paid to nanotechnology for reducing the size of substances to a nanometer level to obtain new physical properties different from the conventional properties of the substances. For example, pulp which is a cellulosic raw material is formed into fine cellulose fiber (cellulose nanofiber) by chemical treatment, pulverization treatment or the like. Fine cellulose fiber is excellent in strength, elasticity, thermal stability, and the like, and is therefore expected to be used in, for example, industrial applications as filtering materials, filter aids, base materials for ion exchangers, fillers for chromatographic analysis equipment, fillers for blending resins and rubbers, and the like, and applications of blending agents for cosmetics such as lipsticks, cosmetic powder, and emulsified cosmetics. In addition, fine cellulose fiber is excellent in aqueous dispersibility, and is therefore expected to be used in many applications of viscosity-retaining agents for foods, cosmetics, coating materials, and the like, strengthening agents for food raw material doughs, moisture-retaining agents, food stabilizers, low-calorie additives, emulsion stabilization aids, and the like.

For obtaining such fine cellulose fiber, a method is used in which a cellulosic raw material is mechanically fibrillated with a high-pressure homogenizer, a high-speed rotary homogenizer, an ultrasonic homogenizer, or the like. However, this method requires a large amount of energy to carry out fibrillation, and causes damage to cellulose fiber.

Thus, Patent Literature 1 suggests a method for producing fine cellulose fiber with less damage to cellulose fiber, and indicates that a commercially available blender, mixer, or the like can be used in fibrillation (stirring) of the fiber. However, in the method of Patent Literature 1, it is necessary to lengthen the fibrillation time for increasing the light transmittance and the viscosity of a dispersion obtained by dispersing fine cellulose fiber. When the fibrillation time is lengthened, damage to cellulose fiber is expanded. In particular, in applications of food, cosmetics, and the like, it is absolutely necessary that the dispersion has high light transmittance, and the requirement for increasing light transmittance for expanding uses of fine cellulose fiber is not avoidable.

In addition, as a method for producing fine cellulose fiber, a method has been suggested in which prior to fibrillation, "a part of hydroxyl groups of cellulose is half-esterified with a polybasic acid anhydride to introduce carboxyl groups thereinto, thus preparing polybasic acid half-esterified cellulose" (see Patent Literature 2).

Further, for the reason that in the method of Patent Literature 2, sufficient size reduction is not achieved, a method has been suggested in which prior to fibrillation, "a fiber raw material containing cellulose is treated with at least one compound selected from phosphorus-oxo acid or a salt thereof" (see Patent Literature 3). Patent Literature 3 indicates that by the method of Patent Literature 3, a part of hydroxy groups of cellulose forming the fiber are substituted with a predetermined functional group to obtain fine fibrous cellulose containing phosphorus-oxo groups and having a fiber width of 1 to 1,000 nm. However, the findings of the present inventors indicate that the fine cellulose fiber dispersion obtained by the method of Patent Literature 3 has room for improvement in terms of light transmittance and viscosity.

CITATION LIST

Patent Literature

Patent Literature 1: JP 2010-216021 A
Patent Literature 2: JP 2009-293167 A
Patent Literature 3: JP 2013-127141 A

SUMMARY OF INVENTION

Technical Problem

An object of the present invention is to provide fine cellulose fiber in which when the fine cellulose fiber is formed into a dispersion, the dispersion has very high light transmittance and viscosity, and a method for producing the fine cellulose fiber.

Solution to Problem

The present inventors have conducted various studies on why a sufficient light transmittance and viscosity cannot be obtained by the method of Patent Literature 3. As a result, the present inventors have found that the key point is the introduction amount (molar amount) of phosphorus-oxo acid per 1 g of cellulose fiber. In this regard, Patent Literature 3 indicates that "the introduction amount of phosphorus-oxo acid groups in hydroxy groups (—OH groups) of cellulose as a fiber raw material is preferably 0.1 to 2.0 mmol, more preferably 0.2 to 1.5 mmol per 1 g (mass) of fine fibrous cellulose". However, as shown in Examples described later, the introduction amount of phosphorus-oxo acid groups is preferably more than 2.0 mmol. In the process of the studies, the present inventors have also found that merely defining the amount of phosphorus-oxo acid added is not sufficient to determine the introduction amount of phosphorus-oxo acid. The amount of phosphorus-oxo acid groups to be actually introduced also depends on production conditions. When the method of Patent Literature 3 is used, the amount of phosphorus-oxo acid groups which can be introduced in one reaction may be at most 2.0 mmol/g or less, and this introduction amount does not ensure that the dispersion has sufficient light transmittance and viscosity. For the introduction amount of phosphorus-oxo acid to be more than 2.0 mmol in the method of Patent Literature 3, it is necessary to carry out a reaction repeatedly. Therefore, it is considered that the method of this document does not assume the case where the introduction amount of phosphorus-oxo acid is more than 2.0 mmol.

On the basis of the foregoing studies and findings, the present inventors have arrived at the following means for solving the above-described problems.

(Means)

Fine cellulose fiber which has a fiber width of 1 to 200 nm, and in which a part of hydroxy groups of the cellulose fiber are substituted with a functional group represented by the following Structural Formula (1) to introduce an ester of phosphorus-oxo acid, and an introduction amount of the functional group represented by Structural Formula (1) is more than 2.0 mmol per 1 g of the cellulose fiber:

[Structural formula (1)]

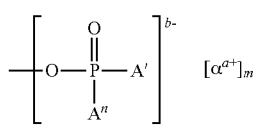

[Chemical Formula 1]

wherein, in Structural Formula (1), a, b, m, and n are natural numbers, at least one of A1, A2, ..., An, and A' is O⁻, and the rest are any of R, OR, NHR, and none, R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group, and a derivative group thereof, and α is a cation composed of an organic substance or an inorganic substance.

(Means)

The fine cellulose fiber, wherein a part of hydroxyl groups of the cellulose fiber are substituted with a carbamate group to introduce a carbamate.

(Means)

The fine cellulose fiber wherein a part of hydroxy groups of the cellulose fiber are substituted with a functional group represented by the following Structural Formula (2) to introduce an ester of phosphonic acid as an ester of the phosphorus-oxo acid:

[Structural Formula (2)]

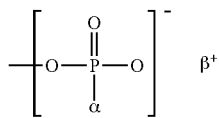

[Chemical Formula 2]

wherein, in Structural Formula (2), α is any of none, R, and NHR, R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group, and a derivative group thereof, and β is a cation composed of an organic substance or an inorganic substance.

(Means)

A method for producing fine cellulose fiber, including
adding a solution having a pH of less than 3.0 to cellulose fiber, the solution including an additive (A) containing at least one of a phosphorus-oxo acid and a phosphorus-oxo acid metal salt, and an additive (B) containing at least one of urea and a urea derivative, and heating the resultant mixture to perform fibrillation.

(Means)

The method for producing fine cellulose fiber,
wherein a hydroxide salt is added to the cellulose fiber, and the cellulose fiber is washed after the heating.

(Means)

The method for producing fine cellulose fiber,
wherein a phosphonic acid is used as a part or the whole of the phosphorus-oxo acid.

Advantageous Effects of Invention

The present invention provides fine cellulose fiber in which when the fine cellulose fiber is formed into a dispersion, the dispersion has very high light transmittance and viscosity, and a method for producing the fine cellulose fiber.

DESCRIPTION OF EMBODIMENTS

An embodiment of the present invention will now be described. This embodiment is an example of the present invention.

(Fine Cellulose Fiber)

The fine cellulose fiber of this embodiment has a fiber width of 1 to 200 nm, a part of hydroxy groups (—OH groups) of the cellulose fiber are substituted (modified or altered) with a functional group represented by the following Structural Formula (1) to introduce an ester of phosphorus-oxo acid (esterification), and the introduction amount of the functional group represented by the following Structural Formula (1) is more than 2.0 mmol (preferably 2.1 mmol or more) per 1 g of the cellulose fiber. More suitably, part of hydroxyl groups of the cellulose fiber are substituted with a carbamate group to introduce a carbamate (an ester of carbamic acid).

[Structural formula (1)]

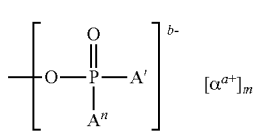

[Chemical Formula 1]

wherein, in Structural Formula (1), a, b, m, and n are natural numbers, at least one of A1, A2, ..., An, and A' is O⁻, and the rest are any of R, OR, NHR, and none, R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group, and a derivative group thereof, and α is a cation composed of an organic substance or an inorganic substance.

The ester of phosphorus-oxo acid is a compound in which a hydroxyl group (hydroxy group) (—OH) and an oxo group (=O) are bonded to a phosphorus atom, and the hydroxyl group gives an acidic proton. The ester of phosphorus-oxo acid has high negative charge, and therefore, when the ester of phosphorous-oxo acid is introduced, repulsion between cellulose molecules is intensified, so that cellulose fiber is easily fibrillated. In addition, when a carbamate is also introduced together with the ester of phosphorus-oxo acid, the light transmittance and the viscosity of the dispersion are extremely improved. In this respect, the carbamate has an amino group. Therefore, when the carbamate is introduced, the carbamate interacts with the ester of phosphorous-oxo acid. As a result, when the carbamate is also introduced, the shearing force of the dispersion may be increased, leading to improvement of the viscosity.

The ester of phosphorus-oxo acid to be introduced is more preferably an ester of phosphonic acid. When the ester of phosphonic acid is introduced, yellowing is reduced, and therefore the dispersion obtained by dispersing fine cellulose fiber has higher light transmittance. In addition, the dispersion has higher viscosity. When the ester of phosphonic acid is introduced, a part of hydroxy groups (—OH groups) of cellulose fiber are substituted with a functional group represented by the following Structural Formula (2).

[Structural Formula (2)]

[Chemical Formula 2]

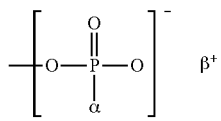

wherein, in Structural Formula (2), α is any of none, R, and NHR, R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group, and a derivative group thereof, and β is a cation composed of an organic substance or an inorganic substance.

The introduction amount of the ester of phosphorus-oxo acid or the ester of phosphonic acid per 1 g of fine cellulose fiber is more than 2.0 mmol, preferably 2.1 mmol or more, more preferably 2.2 mmol or more. The introduction amount is 3.4 mmol or less, preferably 3.2 mmol or less, more preferably 3.0 mmol or less. When the introduction amount is 2.0 mmol or less, there is the possibility that the light transmittance and the viscosity of the dispersion are not sufficiently improved. On the other hand, when the introduction amount is more than 3.4 mmol, cellulose fiber may be dissolved in water.

The introduction amount of the ester of phosphorus-oxo acid is a value evaluated on the basis of results of elemental analysis. For the elemental analysis, X-Max 50 001 manufactured by HORIBA, Ltd. is used.

The introduction amount of the carbamate is preferably 0.06 to 2.34 mmol, more preferably 0.15 to 1.28 mmol, especially preferably 0.39 to 1.02 mmol, per 1 g of fine cellulose fiber. When the introduction amount is less than 0.06 mmol, there is the possibility that the light transmittance and the viscosity of the dispersion are not sufficiently improved. On the other hand, when the introduction amount is more than 2.34 mmol, cellulose fiber may be dissolved in water. The method for calculating the introduction amount of the carbamate is based on the Kjeldahl method.

The fiber width (average diameter of monofilaments) of fine cellulose fiber is preferably 1 to 200 nm, more preferably 2 to 100 nm, especially preferably 3 to 50 nm. When the fiber width is less than 1 nm, there is the possibility that cellulose is dissolved in water, so that physical properties as fine cellulose fiber, such as strength, rigidity, and dimensional stability are not exhibited. On the other hand, when the fiber width is more than 200 nm, the fiber width is about ¹⁄₁₀ times the wavelength of visible light, and therefore there is the possibility that when fine cellulose fiber is dispersed in water (when the fiber is formed into an aqueous dispersion), visible light is refracted and scattered, so that light transmittance is considered insufficient.

The fiber width of fine cellulose fiber is measured in the following manner using an electron microscope.

First, 100 ml of an aqueous dispersion of fine cellulose fiber having a solid concentration of 0.01 to 0.1% by mass is filtered through a Teflon (registered trademark) membrane filter, and solvent substitution is performed once with 100 ml of ethanol and three times with 20 ml of t-butanol. Next, the fine cellulose fiber is freeze-dried, and coated with osmium to obtain a sample. This sample is observed with an electron microscope SEM image at a magnification of 5,000 times, 10,000 times, or 30,000 times depending on the width of the constituent fiber. In this observation, two diagonals are drawn in the observation image, and further, three straight lines passing through the intersection of the diagonals are arbitrarily drawn. The widths of a total of 100 filaments intersecting the three straight lines are visually measured. The median diameter of the measured values is defined as a fiber width.

The axial ratio (fiber length/fiber width) of fine cellulose fiber is preferably 3 to 1,000,000, more preferably 6 to 340,000, especially preferably 10 to 340,000. When the axial ratio is less than 3, the fine cellulose fiber is no longer fibrous. On the other hand, when the axial ratio is more than 1,000,000, the viscosity of the dispersion (slurry) may be excessively high.

The degree of crystallinity of fine cellulose fiber is preferably 50 to 100%, more preferably 60 to 90%, especially preferably 65 to 85%. When the degree of crystallinity is less than 50%, strength and heat resistance may be considered insufficient. The degree of crystallinity can be adjusted by, for example, selection of pulp fiber, pretreatment, fibrillation, or the like.

The degree of crystallinity is a value measured by the X-ray diffraction method in accordance with JIS-K0131 (1996), "General Rule of X-Ray Diffraction Analysis". In addition, fine cellulose fiber has an amorphous part and a crystalline part, and the degree of crystallinity means a ratio of the crystalline part to the entire fine cellulose fiber.

The light transmittance of the dispersion of fine cellulose fiber (solution having a solid content of 0.2%) is preferably 50.0% or more, more preferably 60.0% or more, especially preferably 70.0% or more. When the light transmittance is less than 50.0%, the light transmittance may be considered insufficient. The light transmittance of fine cellulose fiber can be adjusted by, for example, selection of pulp fiber, pretreatment, fibrillation, or the like.

The light transmittance is a value obtained by measuring the light transmittance (transmissivity of light having a wavelength of 350 to 880 nm) of a 0.2% (w/v) fine cellulose fiber dispersion using a Spectrophotometer U-2910 (Hitachi, Ltd.).

The B-type viscosity of a dispersion having a fine cellulose fiber concentration of 1% by mass (w/w) is preferably 10 to 300,000 cps, more preferably 1,000 to 200,000 cps, especially preferably 16,000 to 100,000 cps.

The B-type viscosity is a value obtained by performing measurement in accordance with JIS-Z8803 (2011), "Method for Measurement of Viscosity of Liquid", for a fine cellulose fiber aqueous dispersion having a solid content of 1%. The B-type viscosity is a resistance torque in stirring of a slurry, and a higher B-type viscosity means a larger amount of energy required for stirring.

(Method for Producing Fine Cellulose Fiber)

In a production method of this embodiment, to cellulose fiber is added a solution having a pH of less than 3 and including an additive (A) containing at least one of a phosphorus-oxo acid and a phosphorus-oxo acid metal salt, preferably an additive (B) further containing at least one of urea and a urea derivative, and the mixture is heated to introduce an ester of phosphorus-oxo acid, preferably an ester of phosphorus acid, and a carbamate, into the cellulose fiber. The cellulose fiber containing the ester of phosphorus-oxo acid and the like is fibrillated to obtain fine cellulose fiber.

Preferably, a hydroxide salt is added to the cellulose fiber, and the cellulose fiber is washed after heating and before fibrillation.

(Cellulose Fiber)

As cellulose fiber, plant-derived fiber (plant fiber), animal-derived fiber, microorganism-derived fiber, and the like can be used, for example. Such fiber can be used alone or in combination of two or more types thereof as necessary. It is to be noted that the cellulose fiber is preferably plant fiber, more preferably pulp fiber which is a type of plant fiber. When the cellulose fiber is pulp fiber, it is easy to adjust the physical properties of fine cellulose fiber.

As plant fiber, for example, wood pulp made from hardwood, softwood, and the like, non-wood pulp made from straw, bagasse, and the like, waste paper pulp (DIP) made from waste paper, damaged paper, and the like can be used. These fibers can be used alone or in combination of two or more thereof.

As wood pulp, for example, chemical pulp such as hardwood kraft pulp (LKP) and softwood kraft pulp (NKP), and mechanical pulp (TMP), waste paper pulp (DIP), and the like can be used. These pulps can be used alone or in combination of two or more thereof.

The hardwood kraft pulp (LKP) may be leaf bleached kraft pulp, leaf non-bleached kraft pulp, or leaf semi-bleached kraft pulp. The softwood kraft pulp (NKP) may be softwood needle bleached kraft pulp, needle non-bleached kraft pulp, or needle semi-bleached kraft pulp. The waste paper pulp (DIP) may be any of magazine waste paper pulp (MDIP), newspaper waste paper pulp (NDIP), corrugated waste paper pulp (WP), and other waste paper pulp.

(Additive (A))

The additive (A) contains at least one of a phosphorus-oxo acid and a phosphorus-oxo acid metal salt. The additive (A) includes, for example, phosphoric acid, ammonium dihydrogen phosphate, diammonium hydrogen phosphate, triammonium phosphate, ammonium pyrophosphate, ammonium polyphosphate, lithium dihydrogen phosphate, trilithium phosphate, dilithium hydrogen phosphate, lithium pyrophosphate, lithium polyphosphate, sodium dihydrogen phosphate, disodium hydrogen phosphate, trisodium phosphate, sodium pyrophosphate, sodium polyphosphate, potassium dihydrogen phosphate, dipotassium hydrogen phosphate, tripotassium phosphate, potassium pyrophosphate, potassium polyphosphate, and phosphorous acid compounds such as phosphorous acid, sodium hydrogen phosphite, ammonium hydrogen phosphite, potassium hydrogen phosphite, sodium dihydrogen phosphite, sodium phosphite, lithium phosphite, potassium phosphite, magnesium phosphite, calcium phosphite, triethyl phosphite, triphenyl phosphite, and pyrophosphorous acid. These additives can be used alone or in combination of two or more thereof. However, it is preferable to use a phosphonic acid as a part or the whole of a phosphorus-oxo acid. The use of a phosphonic acid prevents yellowing of cellulose fiber, so that the light transmittance of the dispersion is further improved.

In addition of the additive (A), cellulose fiber may be in a dry state, a wet state, or a slurry state. The additive (A) may be in the form of powder or in the form of an aqueous solution. It is preferable to add the additive (A) in the form of an aqueous solution to cellulose fiber in a dry state because high reaction uniformity is obtained.

The addition amount of additive (A) is preferably 1 to 10,000 g, more preferably 100 to 5,000 g, especially preferably 300 to 1,500 g, based on 1 kg of cellulose fiber. When the addition amount is less than 1 g, there is the possibility that an effect of adding the additive (A) is not obtained. On the other hand, even when the addition amount is more than 10,000 g, the effect of adding the additive (A) may no longer be enhanced.

(Additive (B))

The additive (B) contains at least one of urea and a urea derivative. As the additive (B), for example, urea, thiourea, biuret, phenylurea, benzylurea, dimethylurea, diethylurea, and tetramethylurea can be used. The urea or urea derivatives can be used alone or in combination of two or more thereof. It is preferable to use urea.

When heated, the additive (B) is decomposed into isocyanic acid and ammonia as shown in the following reaction formula (1). Isocyanic acid has high reactivity, and forms a hydroxyl group of cellulose and a carbamate as shown in the following reaction formula (2). Therefore, addition of the additive (B) to the cellulose fiber promotes introduction of the carbamate.

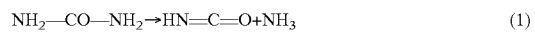

$$NH_2-CO-NH_2 \rightarrow HN=C=O+NH_3 \quad (1)$$

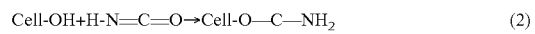

$$Cell\text{-}OH + H\text{-}N=C=O \rightarrow Cell\text{-}O-C-NH_2 \quad (2)$$

where Cell is a cellulose molecule.

The addition amount of the additive (B) is preferably 0.01 to 100 mol, more preferably 0.2 to 20 mol, especially preferably 0.5 to 10 mol, based on 1 mol of the additive (A). When the addition amount is less than 0.01 mol, there is the possibility that introduction of the carbamate does not proceed. On the other hand, even when the addition amount is more than 100 mol, the effect of adding urea may no longer be enhanced.

(Other Additives)

Preferably, to the cellulose fiber is added a hydroxide salt, particularly sodium hydroxide, in addition to the additive (A) and the additive (B). The hydroxide salt has a function as a pH adjuster, and facilitates fibrillation of cellulose due to the osmotic effect.

(Heating)

The heating temperature in heating of cellulose fiber containing the additive (A), the additive (B) and the like is preferably 100 to 210° C., more preferably 100 to 200° C., especially preferably 100 to 160° C. When the heating temperature is 100° C. or higher, an ester of phosphorus-oxo acid can be introduced. However, when the heating temperature is higher than 210° C., cellulose may be rapidly degraded, resulting in coloring and reduction of viscosity. When the heating temperature is higher than 160° C., the B-type viscosity of fine cellulose fiber may be reduced, and the light transmittance may be reduced.

The pH in heating of cellulose fiber containing the additive (A) and the additive (B) is preferably less than 3.0, more preferably 2.8 or less, especially preferably 2.5 or less. The lower the pH, the easier the introduction of an ester of phosphorus-oxo acid and a carbamate becomes. However, when the pH is less than 2.1, light transmittance and viscosity tend to decrease, and particularly when the pH is less than 2.0, degradation of the cellulose fiber may rapidly progress. Therefore, the pH is preferably 2.0 or more, more preferably 2.1 or more.

It is preferable that heating of cellulose fiber containing the additive (A), the additive (B), and the like is performed until the cellulose fiber is dried. Specifically, the cellulose fiber is dried until the moisture content of the cellulose fiber is preferably 10% or less, more preferably 0.1% or less, especially preferably 0.001% or less. Of course, the cellulose fiber may be in a dry state without moisture.

The time for heating cellulose fiber containing the additive (A), the additive (B), and the like is, for example, 1 to 1,440 minutes, preferably 10 to 180 minutes, more preferably 30 to 120 minutes. When the heating time is excessively long, introduction of an ester of phosphorus-oxo acid or a carbamate may excessively progress. In addition, when the heating time is excessively long, the cellulose fiber may be yellowed.

As an apparatus for heating cellulose fiber containing the additive (A), the additive (B), and the like, for example, a hot air dryer, a kiln, a heating kneader, a paper making machine, a dry pulp machine, or the like can be used.

(Pretreatment)

Prior to introduction of an ester of phosphorus-oxo acid and a carbamate into cellulose fiber, or after introduction of an ester of phosphorus-oxo acid and a carbamate, the cellulose fiber can be subjected to pretreatment such as beating if necessary. By pretreating the pulp fiber prior to fibrillation of cellulose fiber, the number of times of fibrillations can be significantly decreased, so that energy for fibrillation can be reduced.

The pretreatment of cellulose fiber can be performed by a physical method or a chemical method, preferably a physical method and a chemical method. Pretreatment by a physical method and pretreatment by a chemical method may be performed either in parallel or separately.

It is preferable to employ beating as pretreatment by a physical method. When cellulose fiber is beaten, cellulose fiber is cut to an even length. Therefore, entanglement of cellulose filaments is prevented (prevention of cohesion). From this viewpoint, beating is performed until the freeness of cellulose fiber is preferably 700 ml or less, more preferably 500 ml or less, especially preferably 300 ml or less.

The freeness of cellulose fiber is a value obtained by performing measurement in accordance with JIS P8121-2 (2012). Further, beating can be performed using, for example, a refiner or a beater.

Examples of the pretreatment by a chemical method include hydrolysis of a polysaccharide with an acid (acid treatment), hydrolysis of a polysaccharide with an enzyme (enzyme treatment), swelling of a polysaccharide with an alkali (alkali treatment), oxidation of a polysaccharide with an oxidizing agent (oxidation treatment), and reduction of a polysaccharide with a reducing agent (reduction treatment). As pretreatment by a chemical method, it is preferable to perform enzyme treatment, and it is more preferable to additionally perform one or more selected from acid treatment, alkali treatment, and oxidation treatment. Hereinafter, alkali treatment will be described in detail.

Examples of the method for alkali treatment include a method in which cellulose fiber containing an ester of phosphorus-oxo acid and the like are introduced into an alkali solution.

The alkali compound contained in the alkali solution may be an inorganic alkali compound or an organic alkali compound. Examples of the inorganic alkali compound include hydroxides of alkali metals or alkaline earth metals, carbonates of alkali metals or alkaline earth metals, and phosphorus-oxo acid salts of alkali metals or alkaline earth metals. Further, examples of the hydroxides of alkali metals include lithium hydroxide, sodium hydroxide, and potassium hydroxide. Further, examples of the hydroxides of alkaline earth metals include calcium hydroxide. Examples of the carbonates of alkali metals include lithium carbonate, lithium hydrogen carbonate, potassium carbonate, potassium hydrogen carbonate, sodium carbonate, and sodium hydrogen carbonate. Examples of the carbonates of alkaline earth metals include calcium carbonate. Examples of the phosphorus-oxo acid salts of alkali metals include lithium phosphate, potassium phosphate, trisodium phosphate, and disodium hydrogen phosphate. Examples of the phosphates of alkaline earth metals include calcium phosphate and calcium hydrogen phosphate.

Examples of the organic alkali compounds include ammonia, aliphatic amines, aromatic amines, aliphatic ammonium, aromatic ammonium, heterocyclic compounds, and hydroxides, carbonates, and phosphates thereof. Specific examples thereof include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, ammonium carbonate, ammonium hydrogen carbonate, and diammonium hydrogen phosphate.

The solvent of the alkali solution may be either water or an organic solvent, but is preferably a polar solvent (a polar organic solvent such as water or alcohol), more preferably an aqueous solvent containing at least water.

The pH of the alkali solution at 25° C. is preferably 9 or more, more preferably 10 or more, especially preferably 11 to 14. When the pH is 9 or more, the yield of fine cellulose fiber is increased. However, when the pH is more than 14, the handleability of the alkali solution is deteriorated.

(Washing)

Preferably, cellulose fiber into which an ester of phosphorus-oxo acid and the like have been introduced is washed prior to fibrillation. By washing the cellulose fiber, byproducts and unreacted substances can be washed away. In addition, when the washing precedes alkali treatment in pretreatment, the use amount of the alkali solution in the alkali treatment can be reduced.

The washing of cellulose fiber can be performed using, for example, water, an organic solvent, or the like.

(Fibrillation)

Cellulose fiber containing an ester of phosphorus-oxo acid and the like are fibrillated (micronized) after washing. By the fibrillation, pulp fiber is microfibrillated into fine cellulose fiber (cellulose nanofiber (CNF)).

For fibrillating cellulose fiber, it is preferable to form the cellulose fiber into a slurry. The solid concentration of the slurry is preferably 0.1 to 20% by mass, more preferably 0.5 to 10% by mass, especially preferably 1.0 to 5.0% by mass.

When the solid concentration is within the above-described range, the cellulose fiber can be efficiently fibrillated.

Fibrillation of cellulose fiber can be performed using one or more means selected from, for example, homogenizers such as high-pressure homogenizers and high-pressure homogenizing apparatuses, millstone-type friction machines such as grinders and mills, refiners such as conical refiners and disc refiners, and various bacteria. However, it is preferable to perform fibrillation of cellulose fiber using an apparatus and method for micronization with a water flow, particularly a high pressure water flow. According to the apparatus and method, the resulting fine cellulose fiber has very high dimensional uniformity and dispersion uniformity. On the other hand, for example, when a grinder that grinds the fiber between rotating grindstones is used, it is difficult to uniformly micronize cellulose fiber, and in some cases, fiber lumps that cannot be fibrillated may partially remain.

Examples of the grinder to be used for fibrillating cellulose fiber include Masscolloider manufactured by MASUKO SANGYO CO., LTD. In addition, examples of the apparatus for micronization with a high-pressure water flow include Star Burst (registered trademark) manufactured by SUGINO MACHINE LIMITED CO., LTD. and Nanovater (registered trademark) manufactured by Yoshida Kikai Co., Ltd. In addition, examples of the high-pressure rotating homogenizer to be used for fibrillating cellulose fiber include CLEARMIX-11S manufactured by M Technique Co., Ltd and the like.

The present inventors have found that when cellulose fiber is fibrillated by grinding the cellulose fiber between rotating grindstones and cellulose fiber is fibrillated by micronization with a high-pressure water flow, and each fiber obtained is observed with a microscope, the fiber obtained by micronization with a high-pressure water flow has a more uniform fiber width.

It is preferable that fibrillation with a high-pressure water flow is performed by a method in which a dispersion of cellulose fiber is pressured at, for example, 30 MPa or more, preferably 100 MPa or more, more preferably 150 MPa or more, especially preferably 220 MPa or more (high pressure condition) by a pressurization machine, jetted from a nozzle having a hole diameter of 50 μm or more to decompress so that the pressure difference is 30 MPa or more, preferably 80 MPa or more, more preferably 90 MPa or more (decompression condition). Pulp fiber is fibrillated due to a cleavage phenomenon caused by this pressure difference. When the pressure in the high pressure condition is low or when the difference in pressure between the high pressure condition and the decompression condition is small, fibrillation efficiency is reduced, and thus it is necessary to repeatedly perform fibrillation (jet the dispersion from the nozzle) for obtaining a desired fiber width.

It is preferable to use a high-pressure homogenizer as an apparatus for performing fibrillation with a high-pressure water flow. The high-pressure homogenizer refers to a homogenizer having an ability to jet a cellulose fiber slurry at a pressure of, for example, 10 MPa or more, preferably 100 MPa or more. When cellulose fiber is treated with a high-pressure homogenizer, collision between cellulose filaments, the pressure difference, micro-cavitation, and the like act to effectively fibrillate cellulose fiber. Therefore, the number of times of fibrillation treatments can be reduced to enhance production efficiency of fine cellulose fiber.

The high-pressure homogenizer is preferably one that causes counter collision of the cellulose fiber slurry in a straight line. Specific example thereof includes a counter collision-type high-pressure homogenizer (Microfluidizer/ MICROFLUIDIZER (registered trademark), wet jet mill). In this apparatus, two upstream flow channels are formed so that counter collision of the pressurized cellulose fiber slurry occurs at a junction part. Further, the cellulose fiber slurry collides at the junction part, and the collided cellulose fiber slurry flows out from a downstream channel. The downstream channel is perpendicular to the upstream channel, and the upstream channel and the downstream channel form a T-shaped channel. When such a counter collision-type high-pressure homogenizer is used, energy given by the high-pressure homogenizer is maximally converted into collision energy, so that cellulose fiber can be more efficiently fibrillated.

It is preferable to fibrillate cellulose fiber so that the resulting fine cellulose fiber shows the desired values or grades for the average fiber width, average fiber length, the degree of crystallinity, and the like.

Examples

Examples of the present invention will now be described.

Tests were conducted in which phosphorus-oxo acid (phosphonic acid), a hydroxide salt (sodium hydroxide), and urea were added to cellulose fiber, and the mixture was heated and washed, and fibrillated to produce fine cellulose fiber. Needle bleached kraft pulp was used as the cellulose fiber. In addition, the fibrillation was performed using high-pressure homogenizer.

The addition amounts of phosphorus-oxo acid, sodium hydroxide, and urea, the pHs of the solutions thereof (Reagent A), the temperature and time for heating, and the number of times of fibrillation passes are as shown in Table 1. The physical properties of the obtained fine cellulose fiber are shown in Table 2. The method for evaluation of the B-type viscosity and the method for evaluation of the light transmittance are as described above. In Table 1, "0 mmol/g" for the addition amount of urea means that "not added", and in Table 2, "0 mmol/g for the introduction amount of the carbamate group" means that "not introduced", and "-" in Comparative Example 3 means "unmeasured".

TABLE 1

| | Addition amount | | | Reagent A | Heating | | Fibrillation |
|---|---|---|---|---|---|---|---|
| | Phosphorus-oxo acid mmol/g | Sodium hydroxide mmol/g | Urea mmol/g | pH | Temperature °C. | Time minute | Number of times of passes |
| Example 1 | 2.78 | 2.78 | 16.68 | 2.1 | 170 | 120 | 1 |
| Example 2 | 2.78 | 2.92 | 16.68 | 2.8 | 170 | 120 | 1 |
| Comparative Example 1 | 2.78 | 3.06 | 16.68 | 4.0 | 170 | 120 | 1 |

TABLE 1-continued

|  | Addition amount | | | Reagent | Heating | | Fibrillation |
|---|---|---|---|---|---|---|---|
|  | Phosphorus-oxo acid mmol/g | Sodium hydroxide mmol/g | Urea mmol/g | A pH | Temperature °C. | Time minute | Number of times of passes |
| Comparative Example 2 | 2.78 | 5.56 | 5.56 | 7.0 | 170 | 120 | 1 |
| Comparative Example 3 | 2.78 | 2.92 | 0 | 2.7 | 170 | 120 | 1 |

TABLE 2

|  | Introduction (modification) — | Phosphorus-oxo acid Introduction amount mmol/g | Average fiber width nm | Carbamate group Introduction amount mmol/g | B-type viscosity CP | Transmittance % |
|---|---|---|---|---|---|---|
| Example 1 | Phosphonic acid | 2.47 | 200 nm or less | 1.02 | 21,400 | 87.5 |
| Example 2 | Phosphonic acid | 2.13 | 200 nm or less | 0.69 | 20,300 | 80.1 |
| Comparative Example 1 | Phosphonic acid | 1.88 | 200 nm or less | 0.63 | 15,000 | 48.9 |
| Comparative Example 2 | Phosphonic acid | 0.89 | 200 nm or less | 0.39 | 8,500 | 38.7 |
| Comparative Example 3 | Phosphonic acid | 0.05 | More than 200 nm | 0 | — | — |

(Discussion)

From Table 2, it can be seen that when the introduction amount of phosphorus-oxo acid groups is more than 2.0 mmol per 1 g of cellulose fiber, both B-type viscosity and light transmittance are improved.

INDUSTRIAL APPLICABILITY

The present invention can be used as fine cellulose fiber and a method for producing the fine cellulose fiber.

The invention claimed is:

1. Fine cellulose fiber which has a fiber width of 1 to 200 nm, and in which
a part of hydroxy groups of the cellulose fiber are substituted with a functional group represented by the following Structural Formula (1) to introduce an ester of phosphorus-oxo acid, and
an introduction amount of the functional group represented by Structural Formula (1) is more than 2.0 mmol per 1 g of the cellulose fiber:

[Structural Formula (1)]

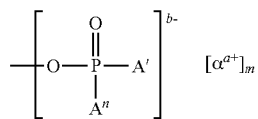

wherein, in Structural Formula (1), a, b, m, and n are natural numbers,
wherein at least one of A1, A2, •••, An, and A' is O⁻, and the rest are any of R, OR, NHR, and none,
wherein R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, and an aromatic group,
wherein a is a cation composed of an organic substance or an inorganic substance;
wherein a method for producing the fine cellulose fiber comprises adding a solution having a pH from 2.1 to 3.0 to the cellulose fiber; and
wherein a light transmittance of a dispersion of the fine cellulose fiber having a solid content of 0.2% is at least 50%.

2. The fine cellulose fiber according to claim 1, wherein a part of hydroxyl groups of the cellulose fiber are substituted with a carbamate group to introduce a carbamate.

3. The fine cellulose fiber according to claim 1, wherein a part of hydroxy groups of the cellulose fiber are substituted with a functional group represented by the following Structural Formula (2) to introduce an ester of phosphonic acid as an ester of the phosphorus-oxo acid:

[Structural Formula (2)]

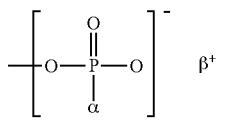

wherein, in Structural Formula (2), α is any of none, R, and NHR,
R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, and an aromatic group, and β is a cation composed of an organic substance or an inorganic substance.

4. A method for producing fine cellulose fiber of claim 1, comprising:
adding the solution having a pH from 2.1 to 3.0 to the cellulose fiber to form a resultant mixture, the solution including an additive (A) containing at least one of a phosphorus-oxo acid and a phosphorus-oxo acid metal salt, and an additive (B) containing at least one of urea and a urea derivative, and
heating the resultant mixture to perform fibrillation.

5. The method for producing fine cellulose fiber according to claim 4,
wherein a hydroxide salt is added to the cellulose fiber, and the cellulose fiber is washed after the heating.

6. The method for producing fine cellulose fiber according to claim 4,
wherein a phosphonic acid is used as a part or the whole of the phosphorus-oxo acid.

7. The fine cellulose fiber according to claim 2,
wherein a part of hydroxy groups of the cellulose fiber are substituted with a functional group represented by the following Structural Formula (2) to introduce an ester of phosphonic acid as an ester of the phosphorus-oxo acid:

[Structural Formula (2)]

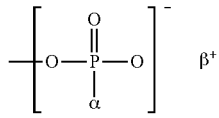

wherein, in Structural Formula (2), a is any of none, R, and NHR,
R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, and an aromatic group,
β is a cation composed of an organic substance or an inorganic substance.

8. A method for producing fine cellulose fiber of claim 2, comprising:
adding the solution having a pH from 2.1 to 3.0 to the cellulose fiber to form a resultant mixture, the solution including an additive (A) containing at least one of a phosphorus-oxo acid and a phosphorus-oxo acid metal salt, and an additive (B) containing at least one of urea and a urea derivative, and
heating the resultant mixture to perform fibrillation.

9. A method for producing fine cellulose fiber of claim 3, comprising:
adding the solution having a pH from 2.1 to 3.0 to the cellulose fiber to form a resultant mixture, the solution including an additive (A) containing at least one of a phosphorus-oxo acid and a phosphorus-oxo acid metal salt, and an additive (B) containing at least one of urea and a urea derivative, and
heating the resultant mixture to perform fibrillation.

10. The method for producing fine cellulose fiber according to claim 5,
wherein a phosphonic acid is used as a part or the whole of the phosphorus-oxo acid.

* * * * *